United States Patent
Kauffeldt

(10) Patent No.: US 7,771,301 B2
(45) Date of Patent: Aug. 10, 2010

(54) PRESSURE SUPPLY TO A CONTINUOUSLY ADJUSTABLE AUTOMATIC TRANSMISSION IN PARTICULAR A CLASPING TRANSMISSION

(75) Inventor: Rudolf Kauffeldt, Einzisweller (DE)

(73) Assignee: ZF Transmission Technologies, L.L.C., Batavia, OH (US)

( * ) Notice: Subject to any disclaimer, the term of this patent is extended or adjusted under 35 U.S.C. 154(b) by 893 days.

(21) Appl. No.: 11/431,263

(22) Filed: May 10, 2006

(65) Prior Publication Data

US 2006/0258493 A1 Nov. 16, 2006

(30) Foreign Application Priority Data

May 11, 2005 (DE) ................. 10 2005 021 866

(51) Int. Cl.
*F16H 61/00* (2006.01)
*F16H 59/00* (2006.01)
*F16H 63/00* (2006.01)

(52) U.S. Cl. ............................. 474/28; 474/8
(58) Field of Classification Search ............ 474/28, 474/8–27
See application file for complete search history.

(56) References Cited

U.S. PATENT DOCUMENTS

| | | | |
|---|---|---|---|
| 4,722,718 A * | 2/1988 | Eugen | 474/19 |
| 4,753,627 A * | 6/1988 | Kawamoto | 474/18 |
| 5,334,108 A * | 8/1994 | Lamers | 474/8 |
| 6,190,274 B1 * | 2/2001 | Walter | 474/28 |
| 6,336,878 B1 * | 1/2002 | Ehrlich et al. | 474/28 |
| 6,824,483 B1 * | 11/2004 | Van Der Laan et al. | 474/28 |
| 2003/0216200 A1 | 11/2003 | List | |

FOREIGN PATENT DOCUMENTS

| | | |
|---|---|---|
| DE | 693 04 105 T2 | 1/1997 |
| DE | 100 37 136 A1 | 3/2001 |
| DE | 102 22 001 A1 | 11/2003 |
| DE | 699 08 828 T2 | 8/2004 |

* cited by examiner

*Primary Examiner*—John Q Nguyen
*Assistant Examiner*—Robert T Reese
(74) *Attorney, Agent, or Firm*—Davis & Bujold, P.L.L.C.

(57) ABSTRACT

A pressure supply between a variator shaft and a pressure chamber (6) for the axial displacement of the mobile disc of a pair of conic pulleys of a continuously adjustable automatic transmission, which includes a longitudinal borehole (7) and radial boreholes (8, 9) in a variator shaft (1), as well as a radial borehole (10) in the locating disc. For each pressure chamber (6) there are at least two piercing radial boreholes made in the variator shaft, which are axially shifted from each other and rotated approximately 90° between themselves. The oil can run over the longitudinal borehole of the variator shaft and over the radial boreholes through the radial borehole in a locating disc of a pressure chamber (6), in such a way that the oil flow is always ensured regardless of the axial position or of the tangential location of the locating disc regarding the variator shaft.

10 Claims, 1 Drawing Sheet

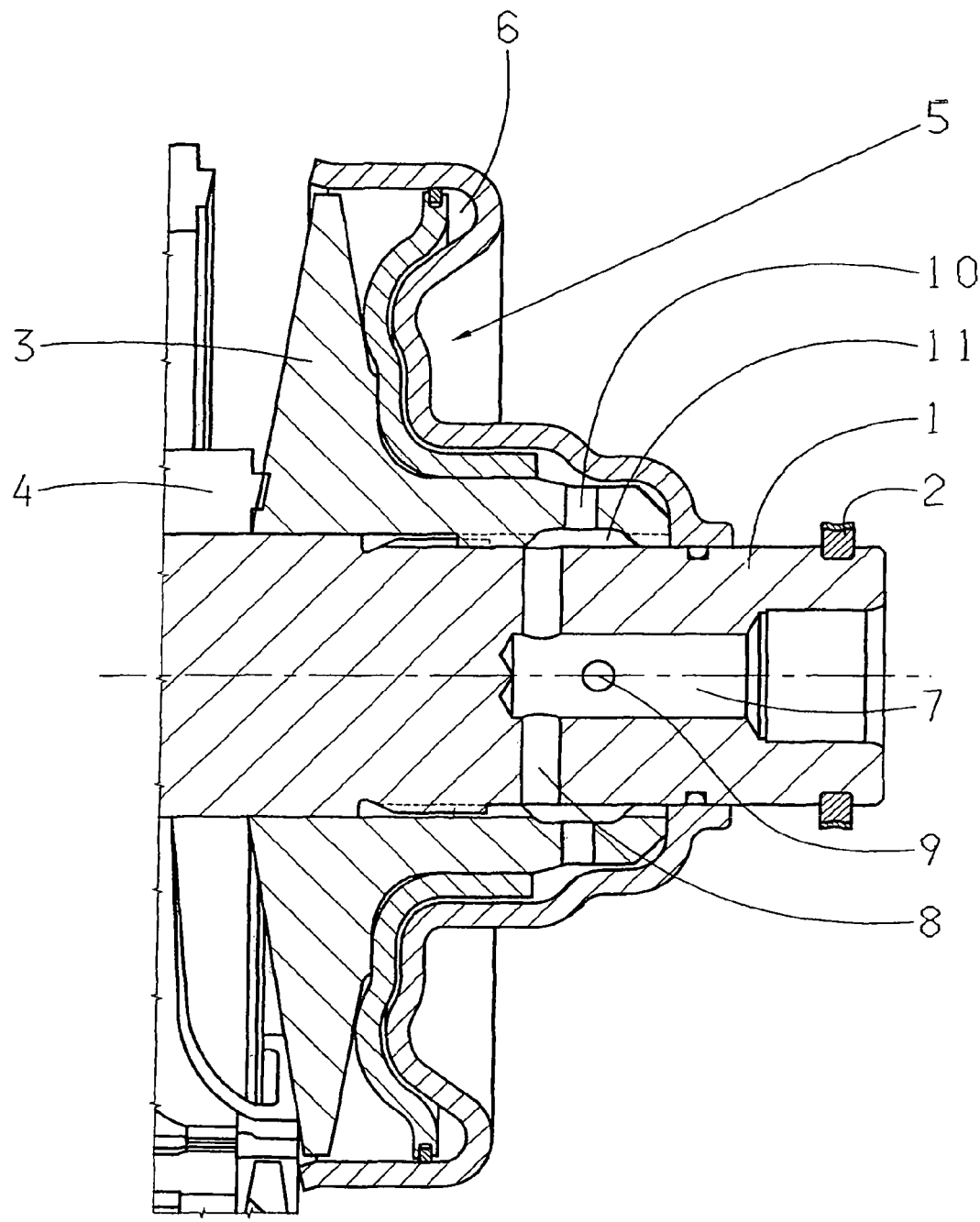

PRESSURE SUPPLY TO A CONTINUOUSLY ADJUSTABLE AUTOMATIC TRANSMISSION IN PARTICULAR A CLASPING TRANSMISSION

This application claims priority from German Application Serial No. DE 10 2005 021 866.0 filed May 11, 2005.

FIELD OF THE INVENTION

The present invention refers to the pressure supply between a variator shaft and a pressure chamber for the axial displacement of a mobile disc (locating disc) of a conic pulley pair in a continuously adjusting automatic transmission, in particular a clasping transmission.

BACKGROUND OF THE INVENTION

A continuously adjusting transmission basically consists of a starting unit, especially a torque converter, a forwards/backwards drive unit with a turning set, an intermediate shaft, a differential, hydraulic and electronic control devices as well as a variator.

In the current state of the art transmissions, the variator includes a primary side which is connected to the drive shaft and a secondary side, which respectively includes a pair of conic pulleys. One of the conic pulleys is statically placed in the axial direction, while the other is movably placed in the axial direction. A variator with a torque transferring clasping element is further provided which turns between the two conic pulley pairs. The used clasping element is usually a thrust linking band, a traction chain or a belt. The current transmission transfer is defined by the barrel radius of the clasping element which, in turn, is a function of the relative axial position of the conic pulleys on the primary and the secondary side.

Under the current state of the art, the relative axial position of the conic pulleys on the primary and the secondary sides would be hydraulically adjusted. Hydraulic pressure would hereby be required for the mobile conic pulleys, in such a way that the relative axial distance of the conic pulleys is a function of the adjusted pressure. For this purpose, the pressurized oil fed from a hydraulic pump must be conducted through a longitudinal borehole in the variator shaft, at least one radial borehole in the variator shaft and a radial borehole in the locating disc in the corresponding pressure chamber.

In the current state of the art, it is known that in order to implement the pressure supply in the variator disc in such a way that the shaft borehole and the locating disc must be exactly aligned between themselves when they find the shaft in the stop position, i.e., in a pressure less position. A duct is located in the locating disc in the axial and radial direction over the shaft borehole which ensures the oil conduction when the disc is moved away from the stop position. This means that the shaft borehole and the locating disc are not superimposed. The locating disc adjustment, therefore, will be typically ensured by taking away one tooth from the shaft profile of the variator shaft and a tooth gap is accordingly filled in the locating disc.

The need for removing a profile tooth from the variator shaft, as well as the required duct in the locating disc, will cause high manufacturing costs. Besides, the assembly process is very elaborate and, as it has already been explained, an oriented assembly is required.

A continuously adjustable clasping transmission is known from the DE 102 22 001 A1 model in which the axially movable conic pulleys of the drive shaft, during the transmission pressureless condition, is loaded through a spring array with an axial force, which increases the contact pressure over the clasping agent and reduces the transmission transfer. Hereby the disc servo-mechanism has two pressure cavities, which will be respectively provided with oil over a radial borehole in the locating disc and over an opening made along the disc movement and over two vertical radially running boreholes made on the hollow bored variator shaft. In addition, a duct is provided in the axial direction above a radial borehole in the variator shaft, which ensures the oil supply.

In line with DE 693 04 105 T2, which concerns a pulley used in a continuously adjustable transmission and with DE 699 08 828 T2, which concerns a control for a continuously adjustable transmission, two pressure chambers are also revealed for the hydraulic adjustment of the pulleys, which are respectively supplied with oil by two non-piercing radial boreholes made in the hollow bored variator shaft and a radial running duct in the locating disc.

A conic disc clasping transmission is further known from DE 100 37 136 A1 in which the pressurizing medium supply of the two intended pressure chambers for the locating disc adjustment is done by way of a fluid connection, which is built as a longitudinal borehole in the variator shaft as a radial running piercing duct in the variator shaft, as well as a radial running duct in the locating disc, whereby the two pressure chambers are connected to each other. Hereby a rotating groove is located in the locating disc for ensuring the oil flow regardless of the axial position of the locating disc. With this construction, an oil supply is possible even in a pressureless condition in case of an oil supply delay.

The present invention approaches the task based on a pressure conduction between the variator shaft and the pressure chamber for the axial displacement of the mobile disc (location disc) of a pair of conic pulleys of a continuously adjustable automatic transmission, in particular a clasping transmission which results in a simplification of the components manufacture. In addition, the need for an oriented assembly is eliminated.

SUMMARY OF THE INVENTION

According to this, it is proposed that for each pressure chamber at least two piercing radial boreholes are provided in the variator shaft, which are axially shifted between themselves and are arranged rotated 90° to each other. In addition, it will be proposed that in at least one component of the variator shaft or of the locating disc a circular notch is provided. It is also possible that the above mentioned angle is arbitrarily varied from 90°.

It is preferably considered that the notch is axially and symmetrically located at the locating disc borehole or at one of the radial boreholes in the variator shaft. In the framework of an especially beneficial further development, the notch in the variator shaft can be basically considered between both piercing radial boreholes which includes both boreholes in this case.

The width of the circular notch must be approximately half of the entire adjustable range of the locating disc. In order to ensure a quick pressurized oil supply, the axial distance between the two piercing radial boreholes must be smaller than the width of the notch.

According to the invention, the boreholes must be preferably arranged in such a way that in case of a pressureless condition, such as the end position of the locating disc, the radial boreholes of the locating disc will be considered axially approximately between the two piercing radial boreholes of the variator shaft.

This invention-based conception will ensure that independently from the axial position or the tangential location of the locating disc with respect to the variator shaft, the oil flow will always be ensured. This has also the result that an oriented assembly is no longer necessary, so that no constructive measure for a defined direction of the locating disc is required.

Another further advantage is that the pressure chambers will be quickly filled with oil as two piercing radial boreholes are provided in the variator shaft per each pressure chamber.

BRIEF DESCRIPTION OF THE DRAWINGS

The invention will now be described, by way of example, with reference to the accompanying drawings in which:

FIG. 1 is a schematic sectional view of the pressure supply, according to the invention.

DETAILED DESCRIPTION OF THE INVENTION

The variator shaft 1 is shown, which is axially secured by a divided ring 2, located over the axially adjustable disc and locating disc 3. The clasping medium is identified with number 4. A pressing device 5 is located next to the locating disc 3, which includes a pressure chamber 6. A hydraulic pump (not shown) supplies pressurized hydraulic oil over a variator shaft 1 for adjusting the variator.

Hereby the variator shaft 1 shows a longitudinal borehole 7, over which the invention based oil pressure supply is taken into pressure chamber 6.

According to the invention, at least two piercing radial boreholes 8, 9 are provided in the variator shaft 1 for pressure supply to each pressure chamber. The boreholes 8, 9 are axially shifted from each other within approximately 90° rotation between them, so that the oil is fed over the radial boreholes 8, 9 through a radial borehole 10 in the locating disc 3 in the pressure chamber 6.

In the framework of an especially convenient embodiment of the invention, it is foreseen that a circular notch 11 is provided in at least one of the components. This is in either the variator shaft 1 or in the locating disc 3. The circular notch 11 in the locating disc 3 is shown in the FIG. 1. Through notch 11, it is ensured that regardless of the axial position of the locating disc 3, this is the relative position of the radial boreholes 8, 9 of the variator shaft 1 and the radial borehole 10 of the locating disc 3 in the pressure chamber 6, the oil will be supplied.

In this case, the circular notch 11 is provided in the locating disc 3, preferably it must be considered axially and basically located symmetrically around the radial borehole 10 of the locating disc 3. In the case that circular notch 11 is in the variator shaft 1, it must be axially considered and basically located symmetrically around the radial boreholes 8, 9 in the variator shaft 1.

According to a further convenient development of the invention, if the circular notch 11 is placed in the variator shaft 1, it can be considered axially and basically located symmetrically between both piercing radial boreholes 8, 9 which, in this case, includes both boreholes 8, 9.

In order to ensure a trouble-free oil supply to pressure chamber 5, the width of the circular notch 11 must be approximately half of the entire adjustable range of the locating disc 3. In order to achieve a quick pressurized oil supply, the axial separation of the two piercing radial boreholes 8, 9 in variator shaft 1 must be smaller than the width of circular notch 11.

FIG. 1 shows the locating disc 3 in its end position in the pressureless condition. As it can be inferred from FIG. 1, the radial boreholes 8, 9, 10 are arranged in such a way that in the pressureless condition, the radial borehole 10 of locating disc 3 is axially considered approximately between the two piercing radial boreholes 8, 9 which are placed in variator shaft 1, where also further arrangement configurations are possible, depending on the hydraulic requirements.

In the case that more than two piercing radial boreholes are provided in the variator shaft, these are particularly axially arranged in such a way that no unbalancing results.

Naturally, each particular configuration, especially each spatial arrangement of the boreholes and as far as technically reasonable, without the pressure supply function as it is stated in the patent claims falls within the scope of protection of the present patent claims, even when the configuration is not explicitly depicted in the description or in the FIGURE.

REFERENCE NUMERALS

1 variator shaft
2 divided ring
3 locating disc
4 clasping medium
5 pressing device
6 pressure chamber
7 longitudinal borehole
8 radial borehole
9 radial borehole
10 radial borehole
11 circular notch

The invention claimed is:

1. A pressure supply between a variator shaft and a pressure chamber for axial displacement of a slidable disc (locating disc) of a pair of conic pulleys of a continuously adjustable automatic transmission, the pressure supply comprising:
   a longitudinal borehole (7) and at least two radial shaft boreholes (8, 9) located in the variator shaft (1);
   at least one radial disc borehole (10) located in the slidable disc (3);
   the at least two radial shaft boreholes (8, 9) are separated and axially spaced from one another along an axis of the variator shaft (1) by an axial distance such that in a first axial position of the slidable disk (3) both of the at least two radial shaft boreholes (8, 9) open to a common annular notch (11) and in a second axial position of the slidable disc (3) only one of the at least two radial shaft boreholes (8, 9) opens to the common annular notch (11), the at least two radial shaft boreholes (8, 9) being located approximately 90° with respect to one another about a rotational axis of the variator shaft (1), the annular notch (11) is located between an inwardly facing surface of the slidable disc (3) and an exterior surface of the shaft (1), an axial width of the annular notch is at least as great as a diameter of a first of the at least two radial shaft boreholes (8, 9) plus a diameter of a second of the at least two radial shaft boreholes (8, 9) plus the axial distance separating the first and the second radial shaft boreholes (8, 9) so that the longitudinal borehole (7), at least one of the first and the second radial shaft boreholes (8, 9), the annular notch (11) and the radial disc borehole (10) continuously direct an oil flow to the pressure chamber (6) from the longitudinal borehole (7) regardless of an axial position and a tangential location of the slidable disc (3) relative to the variator shaft (1) so that oil flow is always ensured; and
   the first axial position is an axial position at which the slidable disc (3) is incapable of further axial movement in a first direction and the second axial position is, an axial position at which the slidable disc (3) is incapable of further axial movement in a second direction.

2. The pressure supply according to claim 1, wherein the annular notch (11) is located such that the oil flow is conducted regardless of a relative position of the radial shaft boreholes (8, 9) and the radial disc borehole (10) in relation to the pressure chamber (6).

3. The pressure supply according to claim 2, wherein the annular notch (11) is placed in the variator shaft (1) and is one of axially symmetrical in relation to the at least two radial shaft boreholes (8, 9) or between both of the at least two radial shaft boreholes (8, 9).

4. The pressure supply according to claim 2, wherein a width of the annular notch (11) is approximately half of an entire adjustable range of the slidable disc (3).

5. The pressure supply according to claim 2, wherein an axial distance between the at least two radial shaft boreholes (8, 9) is smaller than a width of the annular notch (11).

6. The pressure supply according to claim 1, wherein the at least two radial shaft boreholes (8, 9) and the radial disc borehole (10) are arranged such that in a pressure less condition, the radial disc borehole (10) is approximately axially located between the at least two radial shaft boreholes (8, 9).

7. A pressure supply of a continuously adjustable automatic transmission the transmission comprising:
   a slidable disc (3) rotationally fixed to and axially slidable along an exterior surface of a variator shaft (1), an exterior surface the slidable disc (3) partially defines a pressure chamber (6), the slidable disc (3) sliding between a first axial end position at which the pressure chamber (6) is pressurized and an opposed second end position at which the pressure chamber (6) is un-pressurized;
   a longitudinal bore (7) extending coaxially along a rotational axis of the variator shaft (1) and at least first and second shaft bores (8, 9) passing diametrically through the variator shaft (1) and normal to the rotational axis such that oil flows axially through the longitudinal bore (7) and radially through the first and second shaft bores (8, 9) to the exterior of the variator shaft (1);
   a radially extending disc borehole (10) is axially located in the slidable disc (3) and extends normal to the rotational axis, when viewed normal to the rotational axis, between an interior surface of the slidable disc (3) and the pressure chamber (6), the interior surface of the slidable disc (3) has an annular notch (11) which is axially aligned with the disc borehole (10) and facilitates the flow of oil from the longitudinal bore (7) to the pressure chamber (6), and when the slidable disc (3) is in the second axial end position an opening of the disc borehole (10) in the interior surface of the slidable disc (3) is axially located between the first and second shaft bores (8, 9); and
   the first and second shaft bores (8, 9) radially extend normal to each other and intersect with the rotational axis, and are axially spaced from one another so that the first and second shaft bores (8, 9) are completely independent from one another, both of the first and second shaft bores (8, 9) open at the exterior surface of the variator shaft (1) directly to the annular notch (11) when the variator shaft (1) is in the second end position, and the axial length of the annular notch (11) is approximately one half of an entire slidable distance of the slidable disc (3), between the first and the second axial end positions, when the distance between the first and the second axial end positions is at a maximum;
   the first and second shaft bores (8,9) are axially spaced from one another such that only the first shaft bore (8) is directly open to the annular notch (11) when the slidable disc (3) is in the first axial end position, and a second axial position of the slidable disc (3) in which only one of the said radial shaft bores (8, 9) opens to the annular notch (11), to facilitate variable rates of pressurizing the common pressure chamber (6); and
   the first axial end position being defined as a position of the slidable disc when a clasping medium (4) is spaced by a distance from the variator shaft (1);
   the second axial end position being defined as a position of the slidable disk when the clasping medium 4 is directly adjacent the variator shaft (1).

8. A pressure supply between a variator shaft and a pressure chamber for axially displacing, along an exterior surface of the variator shaft, a slidable disc (3) of a pair of conic pulleys of a continuously variable automatic transmission, the pressure supply comprising:
   a longitudinal borehole (7) and at least first and second radial shaft boreholes (8, 9) being axially spaced from one another and extending approximately 90° with respect to one another and extending normal to and coincident with a rotational axis of the variator shaft (1);
   at least one radial disc borehole (10) located in the slidable disc (3);
   at least the first and the second radial shaft boreholes (8, 9) both communicating with a common pressure chamber (6),
   an inwardly facing surface of the slidable disc (3) having an annular notch (11) with an axial width which is approximately one half of a slidable distance of the slidable disc (3), between first and second axially opposed end positions of the slidable disc (3), and is at least as great as a diameter of the first radial shaft borehole (8) plus a diameter of the second radial shaft borehole (9) plus the spacing between the first and the second radial shaft boreholes (8, 9) so that the longitudinal borehole (7) continuously directs an oil flow to the pressure chamber (6), via both of the first and the second radial shaft boreholes (8, 9), the annular notch (11) and the radial disc borehole (10) at least in one of the first and the second axially end positions of the slidable disc (3) along the variator shaft (1);
   in at least one of the first and the second axially opposed end positions of the slidable disc (3) along the variator shaft (1), both of the first and the second radial shaft boreholes (8. 9) directly communicate, via only the annular notch (11), with the radial disc borehole (10)
   the spacing between the first and the second radial shaft boreholes (8, 9) is such that:
      both of the first and the secondradial shaft boreholes (8,9) open directly to the annular notch (11) when the slidable disc (3) is in the second axial end position;
      only the first radial shaft borehole (8) is directly open to the annular notch (11) when the slidable disc (3) is in the first axial end position, to facilitate variable rates, of pressurizing the common pressure chamber (6);
      the second axial end position being defined as a position of the slidable disc when the common pressure chamber (6) is un-pressurized and a clasping medium is directly adjacent the variator shaft (1); and
      the first axial end position being defined as a position of the slidable disk when the common pressure chamber (6) is pressurized and the clasping medium is spaced by a distance from the variator shaft (1).

9. The pressure supply according to claim 8, wherein the at least two radial shaft boreholes (8, 9) are axially independent of each other and a distance of the axial spacing between the at least two radial shaft boreholes (8, 9) is smaller than a width of the annular notch (11).

10. The pressure supply according to claim 9, wherein a divided ring (2) axially fixes the variator shaft (1).

* * * * *